United States Patent [19]

Martin et al.

[11] 4,100,182
[45] Jul. 11, 1978

[54] METHOD OF MAKING ADJUVANT FOR ELASTOMERIC COMPOSITION

[75] Inventors: Frank Stephen Martin, Cranston; Terence Melvin, North Kingstown; Joseph Kirby Pieroni, Providence, all of R.I.

[73] Assignee: Uniroyal, Inc., New York, N.Y.

[21] Appl. No.: 685,249

[22] Filed: May 11, 1976

Related U.S. Application Data

[63] Continuation of Ser. No. 441,716, Feb. 11, 1974, abandoned, which is a continuation-in-part of Ser. No. 284,303, Aug. 28, 1972.

[51] Int. Cl.$^2$ ................................................ C07F 3/06
[52] U.S. Cl. ................................................ 260/429.9
[58] Field of Search ................................ 260/429.9

[56] References Cited

U.S. PATENT DOCUMENTS

| | | | |
|---|---|---|---|
| 2,229,511 | 1/1941 | Long | 260/429.9 |
| 2,395,307 | 2/1946 | Weber et al. | 260/429.9 X |
| 2,452,003 | 10/1948 | Weber et al. | 260/429.9 |

OTHER PUBLICATIONS

Chemical Abstracts, V61, 9599h, (1964).
Chemical Abstracts, V66, 56358c, (1967).
Chemical Abstracts, V68, 13852h, (1968).
Chemical Abstracts, V73, 88643, (1970).
Chemical Abstracts, V69, 27884c, (1968).

Primary Examiner—Helen M. S. Sneed
Attorney, Agent, or Firm—James J. Long

[57] ABSTRACT

An adjuvant for an elastomeric composition is made by mixing methacrylic acid with a suspension of zinc oxide in a liquid medium (such as water or alcohol) in the proportions required to form basic zinc methacrylate. Removal of the liquid from the reaction product and blending of the finely divided reaction product with an elastomer such as cis-polybutadiene yields a compositon which, when cured (for example with an organic peroxide), is hard yet resilient. Molding of the composition in the form of a golf ball produces a durable solid golf ball which has in large measure the play characteristics of a wound golf ball, and substantially retains such characteristics after extended play.

8 Claims, 2 Drawing Figures

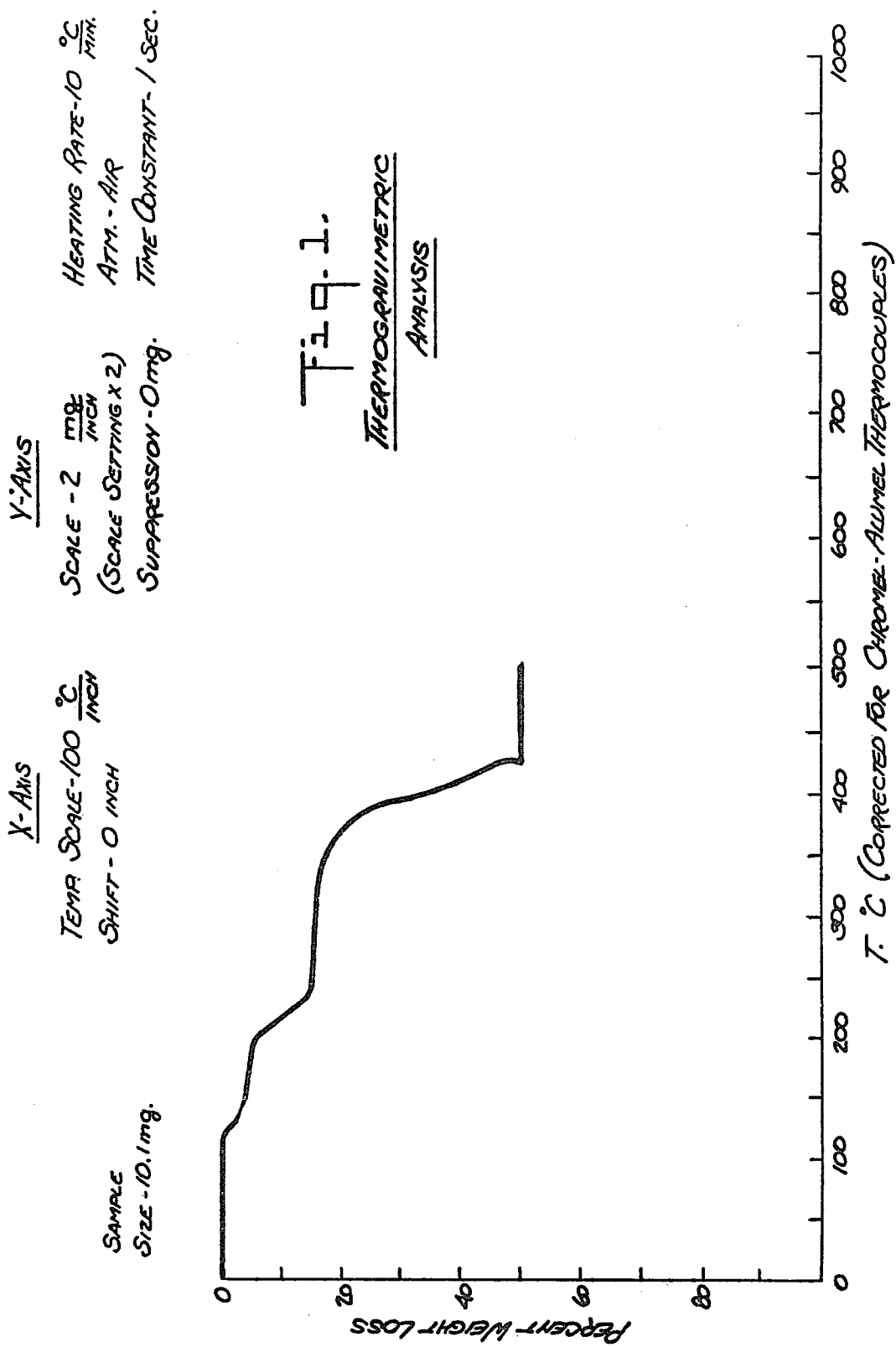

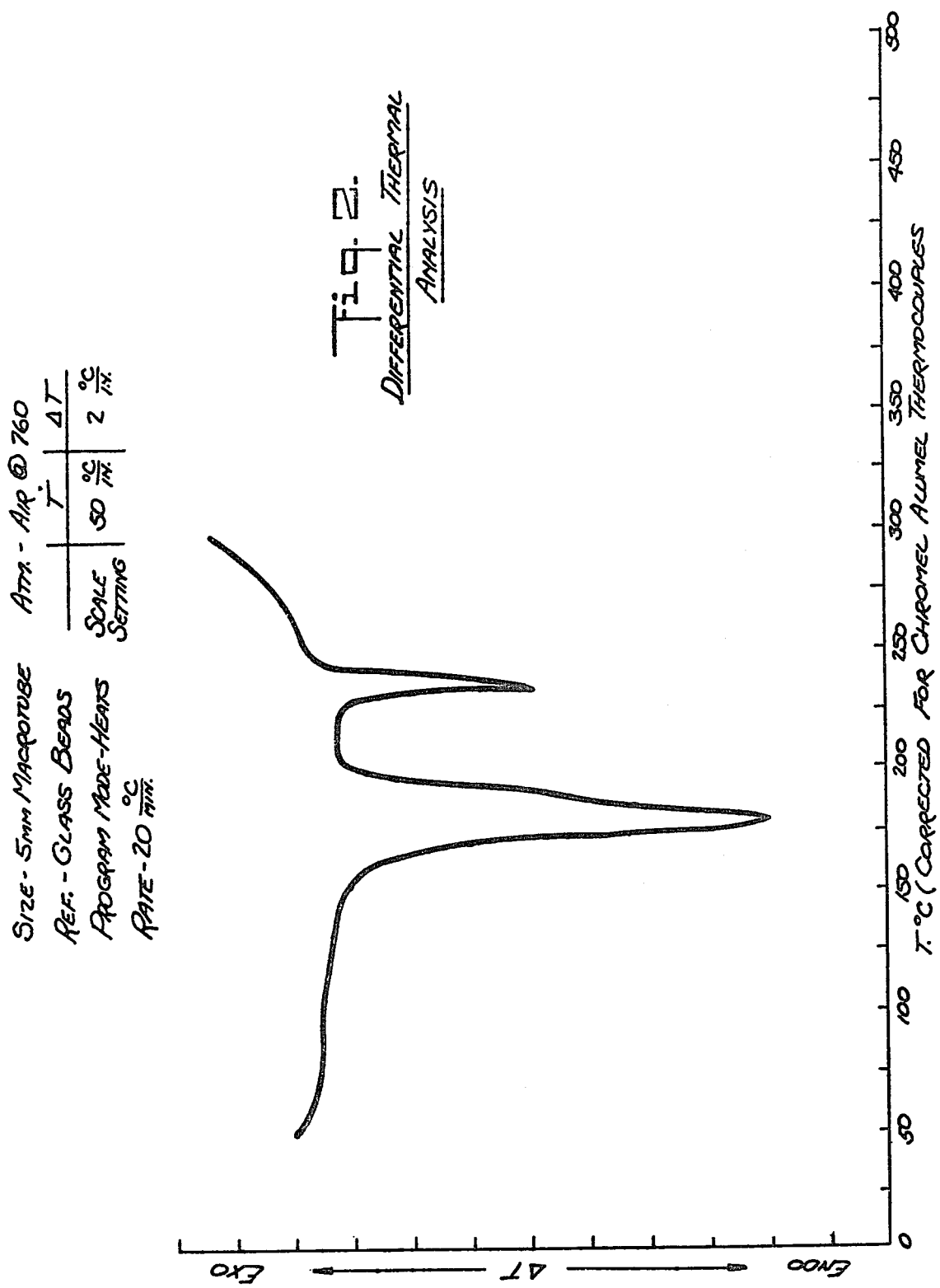

METHOD OF MAKING ADJUVANT FOR ELASTOMERIC COMPOSITION

This is a continuation, of application Ser. No. 441,716, filed Feb. 11, 1974 now abandoned, which is a continuation-in-part of our application Ser. No. 284,303 filed Aug. 28, 1972.

This invention relates to a method of making an adjuvant for an elastomeric composition, and to a method of making an elastomeric composition embodying the adjuvant so produced, as well as to a method of making a molded article such as a golf ball involving molding such composition; the invention also relates to the adjuvant, the elastomeric composition, and the golf ball or other molded article produced by such methods.

In recent years much progress has been made in the field of solid golf balls, that is, unitary integral golf balls made from a single homogeneous composition throughout, as opposed to the traditional wound golf ball which has a more complex structure. U.S. Pat. Nos. 3,238,156, Kohrn, Mar. 1, 1966 and 3,421,766, Chmiel et al., Jan. 14, 1969 are representative prior disclosures in the solid golf ball art.

Prior art teachings on solid golf balls have aimed at attempting to approximate or duplicate as closely as feasible many of the desirable characteristics or specifications for wound golf balls, but it has been desired to achieve further improvements or economies, and, in particular, it has been desired to provide a more resilient golf ball without sacrifice of durability, and to reduce the effects of play on ball characteristics. For example, the usual solid golf ball has had an initial velocity of about 240 feet per second as compared to 248 to 255 feet per second for good wound balls. Some solid golf balls have given higher initial velocities, but they have been of questionable durability.

Attempts to employ zinc dimethacrylate in solid golf ball compositions, particularly involving in situ reaction of zinc oxide and methacrylic acid in an elastomeric medium to form a salt, have, unfortunately, not been entirely satisfactory particularly from the standpoint of providing reproducible high quality results and from the standpoint of avoiding unhealthy pollution and unpleasant environment in the mill room where the elastomeric composition is mixed. Furthermore, zinc dimethacrylate is very difficult to prepare from water solution because it is extremely difficult to dry.

In accordance with one important aspect of the invention, it has now been found that a highly useful adjuvant for an elastomeric composition can be made by mixing methacrylic acid with zinc oxide in a liquid medium in the proportions required to form basic zinc methacrylate, removing the liquid medium, and finely dividing the resulting reaction product. In accordance with another aspect of the invention, an improved unit construction solid golf ball is provided, made of a crosslinked blend of a resilient elastomer with a preformed zinc oxide-methacrylic acid reaction product made by the method described. While it is not desired to limit the invention to any particular theory of operation, it is believed that the function of the zinc oxide-methacrylic acid reaction product in the crosslinked composition is to contribute to the hardness without undue sacrifice of the resilience conferred by the elastomer.

Zinc is an amphoteric element and has a strong tendency to form complex coordination compounds. Therefore, the reaction of zinc oxide with unsaturated organic acids such as methacrylic acid may be very involved and lead to a wide variety of products depending on proportions of reactants and conditions of reaction. The exact chemical formula of such compounds is very difficult, if not impossible, to determine. However, the compounds may be characterized by physical means such as melting point determination or differential thermal analysis. In describing our invention, the terms "basic zinc methacrylate" and "zinc dimethacrylate" are used. This is to imply only that the "basic zinc methacrylate" contains zinc and the methacrylic acid radical in a one-to-one molar ratio, while the zinc dimethacrylate contains zinc and the methacrylic acid radical in a one-to-two molar ratio. Nothing regarding the structural formula of the zinc salt is to be inferred from terminology "basic salt" or "normal salt."

In practicing the invention the molar ratio of zinc oxide to methacrylic acid monomer employed in making the preformed zinc oxide-methacrylic acid adjuvant is ordinarily at least about 0.8 to 1. Preferably approximately equimolar quantities of the zinc oxide and methacrylic acid (i.e., approximately two equivalents of zinc oxide per equivalent of methacrylic acid, then would be the proportions required for basic zinc methacrylate) are employed in preparing the reaction product, but higher proportions, e.g., 1.5 to 2 moles of zinc oxide per mole of methacrylic acid (three to four equivalents of zinc oxide per equivalent of methacrylic acid) may be used. A zinc oxide:methacrylic acid ratio corresponding to normal zinc methacrylate (i.e., 0.5 mole of zinc oxide per mole of methacrylic acid; one equivalent of zinc oxide per equivalent of methacrylic acid) does not give as desirable a result, since the normal salt is very difficult to dry and creates difficulties with reproducibility, whereas the basic salt is readily dried and surprisingly gives highly reproducible results in a golf ball composition. An excess of zinc oxide simply acts as an added filler but a large excess of methacrylic acid is undesirable because it creates difficulties in removing solvent from the preparation.

To prepare the adjuvant the zinc oxide and methacrylic acid are brought together in a liquid medium which aids in dissipating the heat that is liberated by exothermic reaction of the two materials. For this purpose water may be used, or a volatile organic liquid, such as a hydrocarbon liquid or an alkanol or other inert solvent medium. Preferably the zinc oxide is dispersed in the liquid medium and the methacrylic acid is added to the dispersion, while agitating. The liquid medium is a solvent for the methacrylate acid, and essentially a non-solvent for the zinc oxide. A small amount of precipitated hydrated silica is optionally present (e.g., 5–10% of silica based on the weight of the zinc oxide) to prevent agglomeration throughout the processing of the product. The materials may be pre-cooled (e.g., to 0° C.) to serve as a heat sink, but this is not essential. As the reaction draws to a completion the reaction mixture ordinarily thickens or gels and typically turns to the consistency of thin plaster. Evaporation of the solvent yields the zinc oxide-methacrylic acid reaction product in solid form, which is ground up for use in the invention. To achieve the desired properties in the golf ball it is preferable that the zinc oxide-methacrylic acid reaction product be finely powdered, at least to a fineness sufficient to pass a 200 mesh sieve, preferably a 325 mesh sieve (U.S. sieve series), or finer. Larger particle size material, e.g., 40 mesh, may be used but tends to be less efficient, particularly unless broken down considerably during blending with the elastomer.

The described method of preforming the zinc oxide-methacrylic acid adjuvant Prior to blending with the elastomer avoids the hazard and inconvenience which would be encountered in preparing a zinc oxide-methacrylic acid product in situ in the elastomer. It will be understood that such in situ preparation would ordinarily require carrying out the reaction in the millroom in a Banbury mixer or the like. Methacrylic acid is rather volatile and not very soluble in the rubber. Obnoxious toxic and lacrymatory fumes of the acid would be aggravated by the heat generated in the mixing and the heat of neutralization, polluting the mill room atmosphere and creating a hazardous and unpleasant environment. Furthermore, such in situ method gives non-reproducible results because of lack of control over the amount of methacrylic acid lost during the milling. In contrast, the described preforming operating is readily carried out in a segregated area outside the millroom where use of a liquid medium in appropriate covered equipment permits better control of the exotherm and minimizes losses to a small, reproducible amount.

For systems using water as the liquid medium, an equimolar ratio of zinc oxide to methacrylic acid is preferred. Excess methacrylic acid gives a higher proportion of the normal zinc salt (tetrahydrofuran soluble) in the final product; and excess zinc oxide remains as a filler.

The procedure for making the adjuvant in a water medium is to make a zinc oxide-water slurry and then add the methacrylic acid to the slurry with agitation. The mixture of methacrylic acid plus zinc oxide slurry thickens, as the reaction takes place, into a moist powder. The moist powder is then dried and ground. The preferred range of zinc oxide concentration in the water slurry is from 31 to 65 percent by weight zinc oxide with the optimum concentration being 40–50 percent zinc oxide. The percent THF insoluble zinc salt in the final product is 90% or better. As the concentration of zinc oxide in the slurry decreases or increases, the yield of basic zinc salt (THF insoluble) decreases. At the extremes, using no water or a large excess of water, the basic zinc salt (THF insoluble) yield may be less than 1 percent.

The methacrylic acid should be added to the slurry as rapidly as possible. Addition times over 2 or 3 minutes significantly reduce the assay for the basic zinc salt. For example, an addition time of 5 minutes gave an assay below 70 percent as compared to 90% or better with a 30-second addition time.

The reaction temperature does not appear to be critical. Preparations were made at temperatures from 20° to 100° C with little effect on the assay. The chemial assay method is as follows:

A 0.3 g sample of the adjuvant is mixed with 25 ml of tetrahydrofuran and centrifuged. The THF removes normal zinc methacrylate (zinc dimethacrylate) and methacrylic acid. The residue (THF insoluble) contains that portion of the product in which the zinc oxide and methacrylic acid are combined in the proportions required by "basic zinc methacrylate" or zinc-hydroxymethacrylate. The THF insoluble residue is taken up in 40 ml 0.1 N sulfuric acid, forming zinc sulfate, water and methacrylic acid. This mixture is passed through an ion exchange resin column wherein zinc sulphate is exchanged for sulfuric acid; the methacrylic acid passes unchanged through the column. The total acid passing through is collected and titrated. This titer minus the known amount of standard sulfuric acid is equivalent to the amount of material present in the adjuvant having the proportions of "basic zinc methacrylate," as given by the expression;

% basic zinc methacrylate =

$$\frac{[(ml_{NaOH})(N_{NaOH}) - (40)(N_{H_2SO_4})16.74]}{\text{Sample Weight}}$$

As shown in the accompanying drawings, the zinc oxide-methacrylic acid adjuvant of the invention prepared as described displays a characteristic TGA (thermogravimetric analysis) curve, FIG. 1, and a characteristic DTA (differential thermal analysis) curve, FIG. 2. The procedures for obtaining TGA and DTA curves are well known and are described in the instrument manufacturers' manuals and various texts.

The technique of TGA involes, in brief, providing a sample on the arm of a balance in a furnace. The change (usually loss) in weight of the sample is recorded as a function of increasing temperature. FIG. 1 shows that the product of the invention experiences about 5% weight loss between about 120° and 140° C, approximately an additional 10% between about 180° and 240° C, and approximately an additional 35% loss between about 320° and 430° C.

The technique for DTA, in brief, involves measuring the temperature differential between a sample and an inert reference material as a function of increasing temperature. As thermodynamic changes take place (glass transition, crystallization, melting, boiling, decomposition, crystalline modification, etc.) a temperature differential will be observed since the inert reference will not be undergoing these changes. Referring to FIG. 2, the product of the invention is seen to have a pronounced endothermic change peaking at about 180° C, followed by a somewhat smaller endothermic change peaking at about 235° C.

As ordinarily prepared the specific gravity of the reaction product is 2.1. It is only slightly soluble in tetrahydrofuran. Normally the zinc content expressed as zinc oxide is approximately 50% by weight, but this will vary slightly with the ratio of methacrylic acid to zinc oxide employed in the preparation. The moisture content is preferably below 0.5% by weight. The product should be free from any large particles — the finer the grind, the better. The preferred product has very little material present not passing through a 325 mesh sieve. The pH of a water slurry of the material usually varies between 6.0 and 6.25 and does not appear to depend greatly on the ratio of methacrylic acid to zinc oxide employed in the preparation. The product has a white color.

The resilient elastomer with which the preformed adjuvant is blended is suitably a free-radical crosslinkable elastomer, especially a peroxide-crosslinkable elastomer, usually an unsaturated elastomer, preferably a diene rubber, notably polybutadiene, particularly polybutadiene having a high content (viz, 50% or more, preferably at least 80%, more preferably at least 95%) of cis-1,4structure. The preformed zinc oxide-methacrylic acid reaction product is blended with the elastomer in conventional rubber mixing equipment, such as an internal mixer of the Banbury type or on an open roll mill, along with any other suitable desired modifying ingredients. Usually from about 10 to about 60 parts, preferably about 25 to about 45 parts, of preformed zinc oxide-methacrylic acid reaction product are employed per 100 parts by weight of elastomer.

The composition further contains, as a cross-linking or curing agent, a source of free radicals such as a peroxide, hydroperoxide, azo compound, or the like, or radiation such as ionizing radiation or ultra violet light may be used as the source of free radicals. There may be mentioned as suitable for this purpose such free radical curatives as dicumyl peroxide, lauroyl peroxide, benzoyl peroxide, 2,4-dichlorobenzoyl peroxide, 2,5-dimethyl-2,4-di(t-butylperoxy) hexane, n-butyl-4,4-bis-(t-butylperoxy) valerate, t-butylhydroperoxide, azobisisobutyronitrile, etc. The composition is shaped into the form of a golf ball, for example by compression or injection molding in a golf ball mold, and the shaped composition is heated at a temperature sufficient to decompose the free-radical generating agent, for a time sufficient to bring about cure. When using n-butyl-4,4-bis(t-butylperoxy) valerate as the peroxide curative, a curing temperature of about 300° F is the most desirable. Over-curing is undesirable and under-cure does not produce a good ball. Those skilled in the art of free radical curing agents for polymers know how to adjust the cure time and temperature to obtain optimum results from any specific free radical agent. The elastomer becomes cross-linked during the cure and the acrylate radical appears to enter into the reaction in some way so as to give enhanced reinforcement, possibly by bonding the zinc to the polymer.

Other ingredients may be present in the composition. Thus, an ionomer (see U.S. Pat. No. 3,421,766 referred to above, column 2, line 18 to column 3, line 5, for a disclosure of ionomers useful herein) may be admixed with the golf ball composition, for example in amount of 1 to 30 parts per 100 parts by weight of the elastomer, especially as an aid to better processing, including smoother extrusion and better molding of the golf ball. Such ionomer may be described as an ionic copolymer of at least 50 mole percent of one or more alpha-olefins together with a lesser amount of alpha, beta ethylenically unsaturated monocarboxylic acid or dicarboxylic acid, the acid monomer content of said copolymer being from 0.2 to 25 mole percent, said copolymer containing uniformly distributed throughout the copolymer a metal ion having an ionized valence of 1 to 3 inclusive in monocarboxylic acid-containing ionomers and a valence of 1 in dicarboxylic acid-containing ionomers. At least 10% (preferably at least about 30%) of the carboxylic acid groups of the copolymer are neutralized by the metal ions and exist in the ionic state. Ionomers based on copolymers of ethylene and acrylic or methacrylic acid are most common. The metal ions are commonly ions of Groups I, II, III, IV-A and VIII of the periodic table, the more common ones being ions of the alkali metals such as sodium and potassium, and the alkaline earth metals such as calcium, strontium, barium and such commonly available metals as zinc and aluminum. The ionomers are hard, transparent, resinous thermoplastic materials. (See Canadian Pat. Nos. 674,595, Nov. 19, 1963 and 713,631, July 13, 1965; also "Polymer Preprints, A.C.S., Division of Polymer Chemistry, April 1965", Vol. 6, No. 1, pages 287–303).

Other materials such as reinforcing fillers may also be added, for example litharge or zinc oxide in amount of for example 2 to 10 parts per 100 parts of elastomer, particularly for the purpose of increasing the hardness. Useful variations include the possibility of lowering the zinc oxide-methacrylic acid reaction product content of the composition and adding filler to get a golf ball of proper weight with a lower volume loading and better initial velocity properties. Other compounds variations may be employed. For example, impact modifiers such as high molecular weight polyethylene as described in U.S. Pat. No. 3,478,132, Randolph, Nov. 11, 1969, may be added.

The golf ball of the invention may have the usual patterned or dimpled surface, imparted during the molding operation.

Preferred golf balls of the invention have the hardness or compression, and weight required of standard golf balls, and have superior rebound, initial velocity as the ball leaves the club and click to previous solid balls, and in addition they are remarkably durable. They have the surprising ability to retain their original qualities and structural integrity even after being struck repeatedly. Outstanding performance in flight is another important advantage of golf balls of the invention.

The composition from which the golf ball of the invention is made has desirable properties which suggest its use for many other things, for example, solid tires.

The following examples, in which all quantities are expressed by weight, will serve to illustrate the practice of the invention in more detail.

EXAMPLE I

To 100 parts of commercial methanol is added 10 parts of Hi Sil (Trademark; precipitated hydrated silica; optional) and 100 parts of zinc oxide to produce a slurry. While agitating the slurry at room temperature, 100 parts of methacrylate acid (mole ratio of zinc oxide to methacrylic acid 1:0.945), also as room temperature, is added. The temperature gradually rises spontaneously, without noticeable thickening of the mixture, to about 60° C. The temperature then subsides, but thereafter the mixture begins to thicken and the temperature rises again to about 50° C. When about 15 minutes have elapsed from the initial mixing the mix has thickened to the consistency of thin plaster and is poured into a tray to cool and solidify, with evaporation of the methanol. The reacton product is then ground to a fineness such as to pass a 325 mesh sieve. The ratio of zinc to methacrylate groups in the product corresponds approximately to the ratio required by "basic zinc methacrylate" (i.e., the product analyzes about 1 mole of methacrylic acid for each mole of zinc).

The following mix is prepared on a rubber mill:

| | Parts |
|---|---|
| Cis-polybutadiene (Mitsui BROI; cis content 97%) | 100 |
| Zinc oxide-methacrylic acid reaction product | 45 |
| Peroxide curative | 5 |

The peroxide curative is "Luperco (trademark) 230 XL" which contains 50% n-butyl-4,4-bis(t-butylperoxy) valerate with an inert filler. The mix is extruded and cut into biscuits, which are placed in golf ball molds and cured for 20 minutes at 300° F. under pressure as is customary for solid golf balls. The resulting balls have a PGA hardness of 85, rebound of 77 inches, an initial velocity of 247 feet per second on a standard USGA initial velocity tester, and a weight of 1.61 oz. When struck the balls have excellent "click." They may be painted with a white paint or any other desired coating. The balls are subjected to a durability test in a hitting machine which repeatedly hits the ball with a hard blow until failure occurs. After 75 hits (approximately equivalent to 750 hits with a driver) the ball properties (rebound and compression) are substantially unchanged!

EXAMPLE II

A golf ball is prepared from the following composition:

|  | Parts |
| --- | --- |
| Cis-polybutadiene (Mitsui BROI) | 100 |
| Zinc oxide-methacrylic acid adjuvant (reaction product prepared as in Example I) | 45 |
| Ionomer | 20 |
| Curative (Luperco 230 XL) | 5 |

The ionomer may be an ionic copolymer of approximately 96.5 mole-percent of ethylene and 3.5 mole-percent of methacrylic acid with sodium ions uniformly distributed throughout the copolymer to an extent representing about 50% neutralization of the methacrylic acid (ASTM melt index of 10), as represented for example by such commercially available materials as "Surlyn (trademark) A 1555." This composition gives a hardness of 71 Shore C when cured 20 minutes at 300° F. When cured 20 minutes at 320° F. the composition gives a ball having a PGA hardness of 77 with a rebound of 77½ inches.

Addition of 5 parts of litharge to the formulation of Example II increases the Shore C hardness to 75, after a 20 minute cure at 300° F.

Cis-polybutadiene gives greater hardness and better resilience as well as a tougher compound as compared with other elastomers. Thus, substitution of synthetic polyisoprene (Natsyn [trademark]) or neoprene for the cis-polybutadiene of Example I gives Shore C hardnesses of about 47 and 35, respectively, when cured in admixture with 45 parts of the zinc oxide-methacrylic acid reaction product. Diene 35 NFA (trademark) polybutadiene with 30 parts of zinc oxide-methacrylic acid gives a ball having a PGA hardness of 62 but a rebound of only 68. Although these properties are less than optimum, such modifications are adequate for applications other than solid golf balls or for solid golf balls that are not required to conform as closely as feasible to the performance characteristics of a good wound ball. Less preferably, other peroxide-crosslinkable resilient elastomers such as polyurethanes may be used.

EXAMPLE III

This example illustrates a preferred procedure for making the zinc oxide-methacrylic acid adjuvant of the invention, using water as the reaction medium. Forty pounds of zinc oxide, 45 pounds of water and 13 ounces of trimethylol propane trimethacrylate (this is added merely to control dust in the final product and does not significantly affect the reaction or final product) are mixed in a 3 cubic foot Littleford-Lodige mixer to form a slurry. The jacket temperature of the mixer is set at 30° C. Then 42 pounds of glacial methacrylic acid are added to the reaction mixer through a blowcase in about 30 seconds. This mixture is then mixed for twenty minutes with both the agitator and the chopper of the mixer on. Then the reaction product is dropped from the mixer, dried at 100° C. and ground. Yield from the mixer was quantitative and the assay was 92.2% with a THF soluble of 3.7% and 0.6% volatile (3 hrs. at 110° C.).

We claim:

1. A method of making an adjuvant for an elastomer comprising slurrying zinc oxide in a volatile liquid medium selected from the group consisting of water and an alkanol, the concentration of zinc oxide in the slurry being from 31 to 65 percent by weight, thereafter rapidly adding to the slurry, while agitating the slurry, methacrylic acid in an amount such as to provide a zinc oxide-methacrylate acid molar ratio of from 0.8:1 to 2:1 whereby an exothermic reaction between the zinc oxide and the methacrylic acid takes place, the said liquid medium serving to dissipate the heat liberated by the exothermic reaction, subsequently removing the volatile liquid medium from the resulting reaction product to provide a dried product, and grinding the resulting dried product at least to a fineness sufficient to pass a 200 mesh sieve, the resulting product being of white color and having zinc oxide and methacrylic acid combined in the proportions required by basic zinc methacrylate.

2. A method as in claim 1 in which the said liquid medium is water.

3. A method as in claim 1 in which the said liquid medium is an alkanol.

4. A method as in claim 3 in which the said alkanol is methanol.

5. A method as in claim 1 in which a small amount of silica is present as a dispersing aid in the dispersion of zinc oxide in the liquid medium.

6. A method as in claim 1 in which the materials are pre-cooled to serve as a heat sink.

7. A method as in claim 1 in which the said liquid medium is water, the concentration of zinc oxide in the said slurry is from 40 to 50 percent by weight, the zinc oxide and methacrylic acid are employed in approximately equimolar proportions, and the product is ground at least to a fineness of 325 mesh.

8. The product of the method of claim 1.

* * * * *